United States Patent Office 3,347,739
Patented Oct. 17, 1967

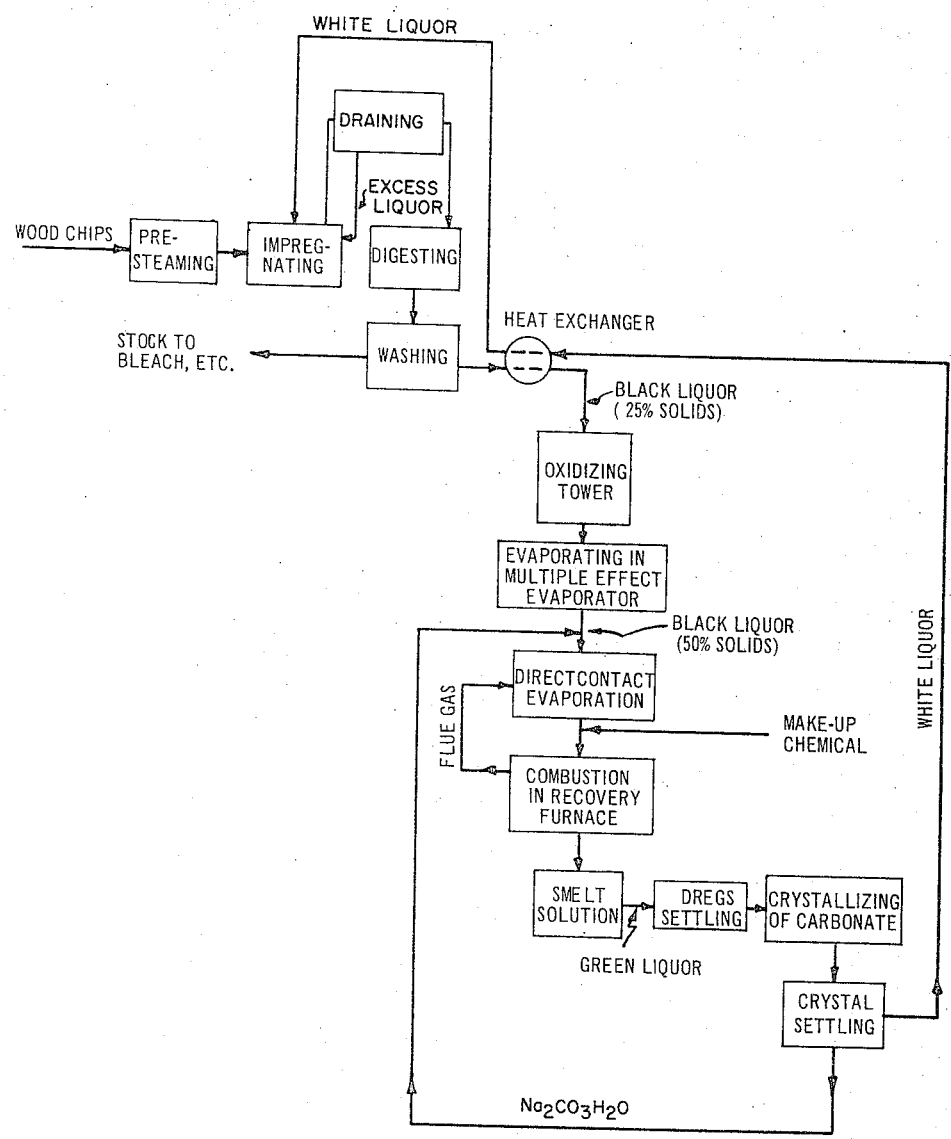

3,347,739
CONTINUOUS SODIUM SULFIDE PULPING
OF CELLULOSIC MATERIAL
George H. Tomlinson II, Long Sault, Ontario, Canada
Filed Sept. 13, 1963, Ser. No. 308,777
Claims priority, application Canada, Sept. 15, 1962,
858,073, Patent 725,072
11 Claims. (Cl. 162—30)

The present invention relates to the manufacture of cellulose pulp, and more particularly, to a cyclic process for the manufacture of pulp by alkaline cooking using a digestion reagent of unusually high sulphidity.

In conventional cooking by the alkaline process, wood chips are treated in a digester, under controlled conditions of temperature, pressure and time, with a liquor consisting essentially of an aqueous solution of sodium hydroxide or of a mixture of sodium hydroxide and sodium sulphide. After completion of each cook the pulp is separated from the residual liquor, washed, and forwarded to further stages of processing. From the residual liquor (called the "black liquor") the spent reagent is recovered in a series of steps which form the recovery and recycling sequence of the conventional process. Thus, the residual liquor is oxidized to prevent the escape of volatile sulphur compounds, then concentrated in evaporators, and finally burnt in a recovery furnace, in which, after combustion of the organic constituents of the liquor, the inorganic constituents, notably the sodium salts, are left in the form of a smelt. The smelt is dissolved in water forming the so-called "green liquor," which is essentially a solution of sodium carbonate and sodium sulphide. The green liquor, after removal of extraneous material, is treated with hydrated lime whereby the carbonate in the solution is converted to caustic in accordance with the well known chemical equation, and the calcium carbonate is precipitated. The remaining liquor now consists of sodium hydroxide and sodium sulphide, substantially the composition of the original liquor, and it can now be re-used in cooking. To compensate for the loss of chemicals that occurs at various stages of the operation (soda and sulphur lost in the washing operation, sulphur lost in escaped volatiles) make-up chemical is added, usually in the form of sodium sulphate: this is usually added, in requisite quantity, to the black liquor as it enters the recovery furnace.

It is well established that in the alkaline process sodium hydroxide is the principal digestion reagent, and it is therefore necessary to maintain an excess of sodium hydroxide in the digester throughout the digestion period. Sodium sulphide is also of importance in the process in that the presence of sodium sulphide increases the rate of lignin removal and thereby improves pulping. Customarily, the cooking liquor in a kraft mill will contain about 25% to 30% of sodium sulphide, based on total active alkali, i.e., the CPPA "sulphidity" will be about 25% to 30%. By definition in alkaline pulping:

"Total alkali"=sum of $NaOH+Na_2S+Na_2CO_3$ expressed as $Na_2O$;

"Active alkali"=sum of $NaOH+Na_2S$ expressed as $Na_2O$;

"Effective alkali"=sum of $NaOH+\frac{1}{2}Na_2S$ expressed as $Na_2O$;

TAPPI "sulphidity"

$$=\frac{Na_2S}{NaOH+Na_2S+Na_2CO_3}\times 100 \text{ in percent}$$

CPPA "sulphidity" $=\frac{Na_2S}{NaOH+Na_2S}\times 100$ in percent

With softwoods, such as spruce, and using a 30% CPPA sulphidity liquor, approximately 16 lb. effective alkali per 100 lb. of wood (dry basis) are required, this corresponding to 18.9 lb. active alkali.

I have now found that by employing a cooking liquor of a CPPA sulphidity substantially about 100%, in a vapour phase digestion process, I have been able to produce from a variety of wood species a number of pulps having properties superior to those of pulps produced from the same species by a conventional alkaline process. I have further found that by carrying out the digestion according to the present invention I can reduce very considerably the effective alkali concentration needed during digestion, compared with what is required in conventional alkaline processes, and thereby avoid some of the wasteful side reactions in which alkali is consumed. I have further found that the residual liquor can be treated for the recovery of heat and inorganic chemicals, and the recovered chemicals can be used to re-form a high-sulphidity liquor of a composition substantially identical with that of the original liquor. But the re-cycling sequence of this invention differs materially from, and has many advantages over, the corresponding sequence in conventional alkaline pulping in that the sodium carbonate formed in the recovery furnace is not subjected to treatment with slaked lime (causticizing), but is in a simple manner converted to a sulphur compound and recycled The elimination of causticizing, and of the concomitant lime-burning operation, will result in considerable savings in capital outlay as well as cost of operation. The process is suitable for use with all species of wood and fibrous vegetable matter such as flax, straw, bamboo, and the like.

The use of high sulphidity cooking liquors is a necessary feature of the process of the present invention. The digestion reagent in the original cooking liquor consists essentially of sodium sulphide and, similarly, the regenerated liquor used in any subsequent cycle contains essentially sodium sulphide obtained from the combustion of the residual liquor resulting from digestion in a previous cycle. All of the sodim hydroxide required for the digestion is obtained from the hydrolysis of sodium sulphide that occurs in solution according to the equilibrium equation: $Na_2S+H_2O \rightleftharpoons NaHS+HaOH$. Such use of sodium sulphide as the principal, and even as the sole, active agent in the digestion of chips, is known per se. Thorensen, U.S. 1,902,106 discloses a process of cooking wherein sodium sulphide is the sole active agent. In "Pulp and Paper Manufacture," edited by J. Newell Stephenson, McGraw-Hill, 1950, vol. I, p. 377, it is stated that excellent pulp can be obtained by cooking with aqueous solutions of sodium sulphide alone, "provided there is sufficient sulphide to give the necessary effective alkali." Yet, though known in the laboratory for many years, sodium sulphide cooking did not, until now, give rise to a commercial process. The inherent difficulties were twofold. First, it was apparent that with conventional methods of cooking very large quantities of sodium sulphide, in fact, larger quantities than might be practical, would be required for digestion. The quantity of sodium sulphide would, indeed, have to be sufficient to supply by hydrolysis, as shown by the equation above, all the sodium hydroxide needed for digestion and to maintain an excess of sodium hydroxide throughout the digestion period. Since, in terms of $Na_2O$, two equivalents of $Na_2S$ must be supplied for each equivalent of NaOH produced, it could be expected that nearly twice the usual amount of chemical would be required if the digestion reagent were to consist solely of sodium sulphide. Such an increased load, to which should be added the recycled sodium carbonate from the smelt, as referred to in more detail hereinbelow, would more than double the quantity of chemicals in the residual liquor supplied to the recovery furnace for a given production, and would decrease the ratio of organic to inorganic matter and adversely affect the combustion qualities of the liquor. It could also be expected that, as a result of such increased content of sulphide, the losses of sulphur (in the form of mercaptans, etc.) as well as the odour problem generally associated with sulphate cooking, would be greatly increased. Secondly, as soon as an attempt is made to reclaim the spent chemicals and to recycle them in the process, the difficulty of regenerating a high-sulphidity liquor becomes apparent. During each passage of the liquor through the recovery furnace a portion of the sulphur is converted to sulphur dioxide and, correspondingly, a certain quantity of sodium carbonate is formed which is found in the smelt. This sodium carbonate has little, if any, pulping action and, unless prevented from building up in the system, will soon swamp the active reagent.

In the process of the present invention I solve the first-mentioned difficulty by materially altering the conditions of the digestion in order to reduce considerably the requirement of caustic compared with conventional processes. I achieve this by carrying out the cooking in two distinct phases, viz by first impregnating the chips with liquor at a temperature below the cooking temperature, the concentration of the liquor being such that, after impregnation, sufficient chemical is carried in the chip to complete the digestion; and by subsequently separating the chips from surplus liquor and heating the impregnated chips with direct steam to a temperature, and for a period of time, necessary to complete the digestion.

It has been known for some time that in conventional alkaline cooking only a small part of the alkali is used up in the dissolution of the lignin, while a major portion of the alkali is consumed by side reactions with the soluble carbohydrates from the wood, etc. This wasteful use of alkali may well be inevitable where the impregnating of the chips and the cooking proper are carried out in one step, as they are conventionally. In conventional batch digestions it is normal practice to surround the chips with the digestion liquor using the latter as a heat exchange medium. Liquor to wood ratios of 4:1 or greater are used, e.g. in the case of spruce, with about one half of the volume of the liquor remaining outside the chips; normally, "black liquor" is added to the digestion liquor (the "white liquor") in order to completely submerge the chips. The pace of digestion is set by the time required for the alkali to diffuse into the chips and while the digestion period is thus unduly and unnecessarily extended, the alkali in that part of the liquor which is not even in touch with the chips, is uselessly consumed in side reactions with soluble carbohydrates and therefore not available to the lignin in the chips.

By carrying out the digestion according to the present invention I ensure that the chips have absorbed by diffusion sufficient chemical for delignification to occur to the desirable extent and then, having removed the remaining liquor, I heat the chips to a temperature necessary to effect the digestion. I have found that following this procedure with liquors of substantially 100% CPPA sulphidity I achieve a reduction in the effective alkali consumption from the 16% (based on moisture-free weight of wood) normally required in conventional alkaline processes to a value which may be as low as 8% or 9%. The importance of this reduction in the wasteful consumption of chemicals will be fully appreciated when its connection with the formation of unwelcome odours is considered. It is known that the sulphate process, as commercially operated, is often the source of a characteristic unpleasant odour. The odour arises, at least in part, from the formation of dimethyl sulphide and methyl mercaptan as a result of the reaction of sodium sulphide with the methoxyl groupings in the lignin. It might have been expected that the liquors of the present invention, in which sodium sulphide forms the total active reagent, would present an even more serious odour problem (as indeed they do when used in conventional batch digestion). I have found that, surprisingly, the practice of this invention presents no significant odour problem at all. By carrying out the impregnation of the chips so that in the digestion step all the alkali is "on site" and immediately available for delignification—and by eliminating black liquor recycle—I ensure that adequate delignification occurs, and the digestion is terminated before significant quantities of the foul smelling organic materials are formed. Elimination of losses of sulphur in this form is important in maintaining the sulphur balance in the system. Also, since less chemical is left over after digestion, less hydrosulphide has to be oxidized at the oxidation stage.

It is preferred to use chips of relatively small size, e.g., conventionally cut chips of ½ inch length, and it is still better to use chips of uniform and relatively small thickness, such as "wafer chips" cut parallel to the fiber axis to approximately ⅛ inch thickness. Alkali is differentially absorbed by wood and a high initial concentration in the liquor is required in order for it to penetrate a thick chip and still carry adequate chemical to the centre. Through the use of thinner and more uniform chips, lower initial alkali concentration can be used and more uniform penetration achieved.

When impregnation is completed and the cooking liquor removed, steam is admitted into the digester to heat the chips to the digestion temperature, which will be generally beween 160° C. and 190° C. and the temperature is held for the necessary time, e.g., between 5 and 90 minutes. The chips are forwarded to washers before or after the digester pressure is released.

The residual liquor is separated from the pulp and subjected to processing to recover the spent reagents for reuse in a subsequent cycle of the process. The liquor is first subjected to non-combustive oxidation which converts sodium hydrosulphide to sodium thiosulphate and thereby prevents subsequent loss of hydrogen sulphide from the solution during evaporation. The liquor is then evaporated in a multiple effect evaporator and burned in a recovery furnace. The furnace may be of any known type, e.g. similar to those presently used for the incineration of sulphate process black liquors; it is equipped with a boiler section for the recovery of the major portion of the heat released in combustion, and is so constructed as to maintain a reducing condition in the region adjacent to the hearth and an oxidizing condition in the upper region of the furnace. In these conditions, the major portion of the sulphur is reduced to sulphide which accumulates on the hearth as a smelt, while a minor portion of the sulphur is oxidized to sulphur dioxide which remains in the flue gases.

The smelt which is tapped from the furnace hearth contains in addition to sodium sulphide also sodium carbonate, and when the smelt is dissolved in water to form the "green liquor" sodium sulphide forms approximately 55–85% of the total alkali, expressed as $Na_2O$. Sodium carbonate has substantially no pulping action and some or substantially all of it will therefore be romeved from the solution so as to prevent it from building up in the system during repeated recyclings. The carbonate is removed in the form of the monohydrate salt which has only limited solubility in concentrated sodium sulphide solutions. To retrieve the alkali that is removed with the carbonate, the latter is added to the residual liquor and the resultant solution exposed to contact with the flue gas from the recovery furnace to absorb the sulphur dioxide and return it to the system. The liquor containing the thus formed sulphites of sodium, to which may be added, if needed, fresh make-up chemical, is sent to the recovery furnace for burning. Alternatively, the carbonate may be dissolved in fresh water and the solution contacted with the flue gases to absorb the $SO_2$. Differently still, the sodium carbonate may be injected as a dust with the secondary and tertiary combustion air to react with the SO₂ in the furnace zone.

After the removal of part or all of the carbonate, the percentage of sodium sulphide in the solution obviously increases and may constitute about 75 percent or more, but more likely between 85 percent and close to 100 percent, of the total alkali; the thus reconstituted digestion liquor may now be recycled to the chip impregnation stage. It will be appreciated that where the smelt from the furnace, and the "green liquor" formed therefrom, have a relatively high sodium sulphide content, say of the order of 75% or higher, the liquor may be recirculated without separation of the carbonate or after separation of only a small part thereof. The liquor re-used for cooking may then be said to have a TAPPI sulphidity which is relatively low, e.g., down to about 75 percent, but its CPPA sulphidity will still be substantially 100 percent, in that substantially all of the sodium hydroxide required for digestion is obtained from the hydrolysis of sodium sulphide. Such liquors, through carrying a certain amount of useless carbonate, are still perfectly suitable as digestion liquors for use in this invention.

The process of this invention for the manufacture of pulp is thus characterized, at the cooking stage, by the use of high sulphidity digestion liquors consisting essentially of an aqueous solution of an alkali metal suphide, which liquors are used to impregnate wood chips until the chips have absorbed between 6 percent and 13 percent of their dry weight of effective alkali, whereupon the chips are separated from the excess liquor and the impregated chips are heated in a digester by means of steam, until delignification is completed. Liquors of effective alkali concentration between 20 and 40 g.p.l. are preferably used. The process is further characterized by a recovery and recycle sequence wherein, from the solution of the smelt obtained from the combustion of the residual liquor in the recovery furnace, a high sulphidity liquor is reconstituted which (after separation, if necessary, of all or part of the alkali metal carbonate), is suitable for re-use in cooking, while the carbonate, when separated out, is returned to the residual liquor and contacted with furnace flue gas to absorb sulphur dioxide therefrom prior to the passage of said liquor into the recovery furnace for burning.

When the system is in operation, the major part of the chemical used for digestion, say, about 85 percent to 95 percent of it, will be in the form of sodium sulphide which has arisen from the conversion of the spent inorganic constituents of the previous cook. To make up for losses of sodium and sulphur at the pulp washing stages, for mechanical loss through leakage at pumps etc., and for any sulphur lost independently of sodium in the form of volatile gases, it is necessary to add sodium and sulphur to the system in some suitable form and at some suitable location. This can be in the form of sodium sulphate and sulphur added to the concentrated black liquor just prior to firing the liquor to the recovery furnace, or in the form of other suitable sodium and sulphur compounds, depending on economic factors. Generally, the amount of sulphur over and above the sulphur contained in the sodium sulphate needed to maintain the chemical balance in this process will be relatively small. As will be clear from the foregoing, the losses are being minimized at every step they are liable to occur: in the digester by operating in the vapour phase, in the evaporation of the black liquor by preliminary oxidation of the liquor, and in the furnace area by recapturing the sulphur gases by contact with the carbonate.

I have found it convenient to operate this process by employing a method and apparatus for continuous pulping described in greater detail in my copending application Serial No. 316,021, filed Oct. 14, 1963, now Patent No. 3,258,390. While the process will, in what follows, be described with particular reference to a continuous method of operation, it will be obvious from the foregoing and from the example below that the process of this invention is independent from any particular mode of operation and can be applied either as a continuous process or as a batch process.

Referring now to the accompanying drawing, the single figure whereof illustrates diagrammatically a flow sheet embodying the invention, wood chips are first subjected to presteaming at atmospheric pressure and then passed to an impregnation vessel wherein the chips are impregnated with the digestion liquor at controlled temperature, time and liquor concentration, as above described. The impregnated chips, substantially free of excess impregnation liquor, are discharged to a cooking vessel where they are heated, e.g., by direct steam, to the cooking temperature and the cooking cycle is carried out at controlled temperature and time. A small amount of liquor, such as may drain from the chips, may be present in the vessel during digestion. When the digestion is completed the chips are passed to washing whence the pulp is sent to further stages of commercial pulp processing, and the black liquor is delivered for subsequent recovery of chemicals.

The black liquor, which in this instance leaves the washer at a relatively high concentration—about 25% total solids—is used to preheat the fresh cooking liquor, and is subsequently subjected to oxidation by contact with air, and evaporated in a multiple effect evaporator until its solid content is about 50%. Crystalline sodium carbonate, which has been separated from a solution of the smelt obtained in a previous cycle is added to the liquor at this stage, and the liquor is directly and intimately contacted with the hot flue gas from the recovery furnace. Further evaporation of the liquor occurs as a result of contact with the hot flue gas. At the same time, sulphur dioxide carried in the flue gas is absorbed by the sodium carbonate while simultaneously sodium salts contained as a colloidal fume in the flue gas are entrained by the liquor and thus recovered. The thus still further concentrated liquor, to which, at this stage, may be added sodium sulphate in an amount sufficient to make up for losses of sodium sulphide at various points in the cycle, is then sprayed into the recovery furnace and burned. The smelt from the furnace containing about 55–85% sodium sulphide (in terms of Na₂O) is collected, dissolved and further processed to separate the carbonate from the sulphite, while the flue gas is directed to meet the incoming black liquor which traps the sulphur dioxide and the colloidally dispersed solids and returns them to the furance. It will be apparent that the causticizing step which is necessary for the conversion of the carbonate in a conventional kraft process, is completely eliminated in the cyclic process of this invention and, consequently, very considerable savings are achieved in capital outlay (there being no need for causticizing tanks, lime kilns, etc.) and in operating costs.

Separation of the carbonate can be carried out in any known manner. For example, the smelt can be dropped continuously directly from the furnace into a solution tank carrying a smelt solution held at a concentration just less than the solubility of sodium carbonate in a sulphide solution, the concentration being maintained by the controlled addition of water. The solution of smelt is continuously withdrawn, settled to remove "dregs" (such as traces of carbon, calcium carbonate, insoluble compounds of iron, etc.), and the decanted solution is evaporated in a crystallizer. Sodium carbonate monohydrate crystallizes out and is separated from the mother liquor which contains substantially all the sodium sulphite. The carbonate crystals are washed, and returned to the black liquor, and through it to the system. In another method, the smelt is cooled before it is contacted with water and the sodium sulphide is leached from the smelt, the sulphide concentration being maintained at about 200 g.p.l. at which concentration the carbonate has only very low solubility. The major part of the carbonate is sent to the black liquor while a small portion, in solution, is added to the leach mixture. The sodium sulphite solution obtained in either manner is used for digestion of fresh chips, thus closing the cycle.

The following examples of pilot plant pulp production are given to illustrate the process of the present invention:

Example 1

Spruce wafers having a moisture-free weight of 4510 gms. and a moisture content of 39.0% were placed in the digester and steamed at atmospheric pressure for 10 minutes to displace air. The digester was then filled with liquor at 130° C. consisting essentially of a solution of sodium sulphide and containing 27.6 g.p.l. of effective alkali. The effective alkali charged to the digester amounted to 1143 grams. A hydrostatic pressure of 100 p.s.i.g. was applied and the liquor in the digester was circulated and maintained at a temperature of 130° C. for a period of 30 minutes. At the end of this time the pressure on the digester was reduced to the steam pressure at the digester temperature and all the free liquor was withdrawn. It was found that this liquor contained 768 grams of effective alkali so that 375 grams of effective alkali or 8.2% of the weight of wood was retained by the chips and available for digestion.

The digester was then brought up to 150 p.s.i.g. pressure in three minutes with direct steam and maintained at this pressure for 40 minutes. The temperature at the top of the digester during this period was 178–180° C. At the end of this period the pressure was reduced to atmospheric and the resultant pulp washed and screened.

Example 2

A second cook was carried out following the same procedure except that after five minutes of atmospheric presteaming the pressure was increased to 30 p.s.i.g. and held for 2 minutes. The pressure was then rapidly reduced to atmospheric and the procedure repeated. The cooking liquor was then added, the concentration of the liquor being 31.6 g.p.l.

After impregnation and withdrawal of the free liquor, 9.7% effective alkali on the wood was retained by the chips. The increased retention of chemical permitted the production of a pulp having a lower bleach demand than that of the previous cook.

Data with regard to chemical requirement, yield obtained, and pulp characteristics for Examples 1 and 2 are as follows:

|  | Example 1 | Example 2 |
|---|---|---|
| Effective alkali, g.p.l. in liquor (as Na$_2$O) | 27.6 | 31.6 |
| Sulphide (as percent of total alkali) | 89.3 | 92.5 |
| Effective alkali in original liquor (gm.) | 1,143 | 1,303 |
| Effective alkali in withdrawn liquor (gm.) | 768 | 866 |
| Effective alkali retained by wood after impregnation (gm.) | 375 | 437 |
| Effective alkali retained by wood after impregnation (percent of wood) | 8.2 | 9.7 |
| Yield: | | |
| Screened (percent) | 48.4 | 46.7 |
| Rejects (percent) | 0.8 | 0.3 |
| Total (percent) | 49.3 | 47.0 |
| Chlorine No. | 7.1 | 4.7 |
| 40 c.c. Tappi Permanganate No. | 24.6 | 17.0 |
| Tappi Viscosity (0.5% cupriethylenediamine) | 47.6 | 30.7 |
| G.E. Brightness | 23.6 | 29.4 |

These pulps, without drying, were treated in the Valley beater and the pulp samples taken at various times were formed into hand-sheets and tested according to Tappi Standards T–205 and T–220. The following values were obtained for the original pulps and for those obtained after beating to 450 and 300 Canadian Standard Freeness.

|  | Example 1 | | | Example 2 | | |
|---|---|---|---|---|---|---|
| Beating Time (min.) | 0 | 67 | 89 | 0 | 58 | 82 |
| Canadian Standard Freeness (cc.) | 676 | 450 | 300 | 674 | 450 | 300 |
| Bulk (cc./gm.) | 1.63 | 1.31 | 1.27 | 1.56 | 1.30 | 1.27 |
| Tensile Breaking Length (km.) | 7.6 | 14.3 | 14.5 | 10.5 | 14.9 | 15.1 |
| Tappi Burst Factor | 52 | 109 | 107 | 72 | 112 | 111 |
| Tappi Tear Factor | 216 | 123 | 125 | 166 | 116 | 117 |
| Burst plus ½ Tear | 160 | 171 | 170 | 155 | 170 | 170 |
| MIT Folds | 680 | 2,700 | 2,900 | 900 | 2,150 | 3,070 |

The relationship of the Tappi viscosity (which is a function of the molecular size of the cellulose in the pulp) to the chlorine number (which is a function of the residual lignin in the pulp) is particularly favourable for pulps produced by the present process when compared with that obtainable with the sulphate process. The strength values of these pulps are also outstanding compared with those obtainable by the sulphate process, or, in fact, by any other method.

A comparison between pulps produced by the conventional kraft process and the process of this invention (vapour phase process using high sulphidity liquors) is shown in Examples 3 and 4.

Example 3

Six cooks were carried out by impregnating spruce chips with sufficient liquor to carry out the digestion, then withdrawing the excess liquor, and bringing the digester and content up to cooking temperature with direct steam as quickly as possible. By varying the concentration of the impregnating liquor and the time, and also the cooking temperature, pulps of different chlorine numbers were obtained.

The conditions of the cooks were as follows:

| Cook No. | Original liquor | | Green Liquor | Effective Alkali retn'd on wood, Percent | Impregnation | | Cooking | |
|---|---|---|---|---|---|---|---|---|
|  | Effective Alkali, g./l. | CPPA sulphidity, Percent | TAPPI sulphidity, Percent |  | Time, min. | Temp., °C. | Time, min. | Press., p.s.i.g. |
| 4013 | 31.5 | 100 | 86.7 |  | 20 | 130 | 30 | 140 |
| 4045 | 28.2 | 100 | 91.5 | 10.7 | 30 | 130 | 30 | 150 |
| 4042 | 31.0 | 100 | 89.8 | 12.5 | 30 | 130 | 30 | 150 |
| 4046 | 25.1 | 100 | 90.8 | 11.2 | 30 | 130 | 30 | 150 |
| 4047 | 24.8 | 100 | 89.6 | 9.6 | 20 | 130 | 30 | 150 |
| 4375 | 27.9 | 100 | 90.0 | 10.8 | 20 | 130 | 20 | 150 |

The pulps from these cooks were compared with a pulp from a conventional kraft process (25.7% sulphidity). The properties of the pulps were as follows:

| Cook No. | Total Yield, percent | Cl₂ No. | CED Viscosity | Strength at 450 C. S. Freeness ||||||| 
|---|---|---|---|---|---|---|---|---|---|---|
| | | | | Beating Time, Mins. | Bulk, cc./gm. | Tensile, Bl./km. | Burst | Tear | Burst plus ½ Tear | Fold |
| Conventional kraft |||||||||||
| 4010 | 48.3 | 7.2 | 27.6 | 66 | 1.31 | 12.9 | 98 | 107 | 152 | 1,420 |
| Present Process |||||||||||
| 4013 | 48.6 | 7.3 | 34.0 | 67 | 1.32 | 15.2 | 114 | 116 | 172 | 2,250 |
| 4045 | 49.7 | 7.8 | 49.0 | 84 | 1.29 | 14.7 | 119 | 98 | 168 | 1,820 |
| 4042 | 49.3 | 8.0 | 44.8 | 72 | 1.31 | 15.6 | 124 | 112 | 180 | 2,100 |
| 4046 | 51.4 | 9.8 | 53.6 | 90 | 1.33 | 14.0 | 108 | 112 | 164 | 2,010 |
| 4047 | 54.7 | 13.9 | 69.0 | 102 | 1.31 | 13.6 | 109 | 104 | 161 | 2,370 |
| 4375 | 48.8 | 7.5 | 37.6 | 66 | 1.27 | 14.5 | 115 | 109 | 170 | 2,538 |

Example 4

Pulps were produced from spruce wafers (instead of regular chips) using respectively a conventional kraft process and the process of this invention.

The conditions of the cooks were as follows:

| Cook No. | Original liquor || Green Liquor | Effective Alkali retn'd. on wood, percent | Impregnation || Cooking |||
|---|---|---|---|---|---|---|---|---|---|
| | Effective Alkali, g./l. | CPPA sulphidity, percent | TAPPI sulphidity, percent | | Time, min. | Temp., °C. | Time to Temp., min. | Time at Temp., min. | Press, p.s.i.g. |
| Conventional kraft ||||||||||
| 4201 | 42.0 | 31.7 | | 14 | | | 60 | 75 | 120 |
| 4207 | 39.8 | 30.8 | | 13 | | | 60 | 75 | 120 |
| 4199 | 38.7 | 30.6 | | 13 | | | 60 | 60 | 118 |
| Present Process ||||||||||
| 4235 | 31.6 | 100.0 | 92.5 | 9.7 | 30 | 130 | 3 | 40 | 150 |
| 4243 | 27.6 | 100.0 | 89.3 | 8.2 | 30 | 130 | 3 | 40 | 150 |
| 4238 | 24.5 | 100.0 | 89.3 | 7.6 | 30 | 130 | 3 | 40 | 150 |

A comparison of the properties of these pulps follows:

| Cook No. | Total Yield, percent | Cl₂ No. | CED Viscosity | Strength at 450 C. S. Freeness |||||||
|---|---|---|---|---|---|---|---|---|---|---|
| | | | | Beating Time, Mins. | Bulk, cc./gm. | Tensile, Bl./km. | Burst | Tear | Burst plus ½ Tear | Fold |
| Conventional kraft |||||||||||
| 4201 | 47.4 | 4.7 | 25.3 | 54 | 1.32 | 13.8 | 101 | 118 | 160 | 2,560 |
| 4207 | 48.2 | 7.2 | 38.5 | 62 | 1.30 | 13.6 | 111 | 114 | 168 | 1,730 |
| 4199 | 50.5 | 8.9 | 43.0 | 69 | 1.30 | 13.7 | 110 | 109 | 165 | 2,182 |
| Present Process |||||||||||
| 4236 | 47.0 | 4.7 | 30.7 | 58 | 1.30 | 14.9 | 112 | 116 | 170 | 2,150 |
| 4243 | 49.3 | 7.1 | 47.6 | 67 | 1.31 | 14.3 | 109 | 123 | 171 | 2,700 |
| 4238 | 49.3 | 8.9 | 53.6 | 73 | 1.30 | 14.2 | 108 | 122 | 169 | 4,870 |

A comparison with kraft pulps shows that with the process of this invention it is possible to reach the same chlorine levels using considerably less effective alkali and the pulps of this invention have higher values than the corresponding kraft pulps in all strength properties.

Example 5

Hardwood chips containing 34.6% moisture were fed to a continuous digester of the type disclosed in copending application No. 316,021, filed Oct. 14, 1963, now Patent No. 3,258,390, at the rate of 3.25 lbs. of moisture-free wood per minute. The chips were presteamed in the presteaming vessel under a steam pressure of 10 p.s.i.g. for about 5 minutes. The presteamed chips were introduced into an impregnating vessel in which a liquor level was maintained up to the level of the chip inlet. The chips were carried through this vessel by means of a conveyor at a speed such as to give it a residence time of 30 minutes for impregnation. The liquor in the impregnation vessel had a concentration of 23 g.p.l. effective alkali, and this concentration was maintained by adding fresh liquor to a fraction of the impregnating liquor which was recycled through the circulating line. In order to maintain the concentration, a fresh liquor flow of 0.725 U.S. gallons per minute at a concentration of 62 g.p.l. effective alkali was established. The fresh liquor was made to a CPPA sulphidity of 98.4, while the liquor in the impregnating tube had a sodium hydrosulphide content of 69% based on total alkali. The liquor in the impregnating vessel was maintained at a temperature of 136° C. and a pressure of 30 p.s.i.g.

Following impregnation the chips were introduced into the cooking vessel which was held at 150 p.s.i.g. by the addition of direct steam. The chips were retained in the cooking zone for 30 minutes. Condensate and the liquor which drained from the chips as the digestion proceeded were removed from the bottom of the digester, the cook being carried out essentially in the vapour phase. At the end of the cooking period the chips were removed from the digester and allowed to flash to atmospheric pressure.

Cooking under these conditions produced a pulp with the following properties:

| | |
|---|---|
| Chlorine No. | 3.4 |
| C.E.D. Viscosity, cp. | 19.3 |
| G.E. Brightness | 16.9 |
| Screen Rejects (percent of O.D. pulp) | 0.88 |

| Strength properties: | | | |
|---|---|---|---|
| Beating Time (mins.) | 0 | 17 | 34 |
| Canadian Standard Freeness (cc.) | 555 | 450 | 300 |
| Bulk (cc./gm.) | 1.68 | 1.45 | 1.39 |
| Tensile Breaking Length (km.) | 5.8 | 8.1 | 9.9 |
| Tappi, Burst Factor | 29 | 55 | 68 |
| Tappi, Tear Factor | 91 | 96 | 89 |
| Burst plus ½ Tear | 75 | 103 | 113 |
| N.I.T. Fold | 13 | 220 | 520 |

*Example 6*

Green pine chips were added to the continuous digester at the rate of 2.42 lbs. of oven-dry wood per minute. The feed liquor composition was 58.9 g.p.l. effective alkali and 100% sulphidity. This liquor was fed at a rate of 0.62 U.S. gallons per minute and gave a liquor of 26.5 g.p.l. effective alkali and a sodium hydrosulphide content of 67.0% in the impregnating tube. The liquor in the recirculation was heated to a temperature of 145° C. All other conditions in the digester were essentially the same as in Example No. 5.

This cook yields the following pulp properties:

| | |
|---|---|
| Chlorine No. | 5.0 |
| C.E.D. Viscosity, cp. | 14.4 |
| G.E. Brightness | 25.0 |
| Screen Rejects (per cent of pulp) | 1.38 |

| Strength properties: | | | |
|---|---|---|---|
| Beating time (min.) | 0 | 41 | 62 |
| Canadian Standard Freeness (cc.) | 640 | 450 | 300 |
| Bulk (cc./gm.) | 1.61 | 1.34 | 1.26 |
| Tensile Breaking Length (km.) | 8.0 | 10.4 | 11.6 |
| Tappi Burst Factor | 61 | 87 | 85 |
| Tappi Tear Factor | 132 | 98 | 94 |
| Burst plus ½ Tear | 137 | 136 | 132 |
| MIT Fold | 870 | 1,760 | 1,950 |

What I claim is:

1. The continuous process of producing pulp from cellulosic raw material such as wood chips comprising: introducing a digestion liquor wherein the active digestion ingredient consists essentially of an alkali metal sulphide into an impregnation zone, continuously moving said cellulosic raw material through said impregnation zone at a controlled rate thereby to cause said raw material to retain a quantity of digestion liquor carrying sufficient chemical for subsequent digestion into pulp, continuously moving said raw material substantially free of excess liquor from said impregnation zone and into a digestion zone, subjecting said raw material in said digestion zone to a digestion temperature for a sufficient time to digest said raw material by means of the digestion liquor retained therein to form a pulp, separating the pulp from residual liquor, subjecting said residual liquor to noncombustive oxidation thereby to convert volatile sulphur compounds into nonvolatile sulphur compounds, concentrating said residual liquor, subjecting said concentrated residual liquor to self-sustaining combustion in a recovery furnace thereby to recover heat and to form a smelt containing alkali metal sulphide, forming from said smelt an aqueous solution of said alkali metal sulphide wherein said alkali metal sulphide constitutes at least 75 percent of the solute, and returning said formed aqueous solution of alkali metal sulphide at digestion liquor into the impregnation zone.

2. A process as defined in claim 1 wherein said alkali metal sulphide is sodium sulphide.

3. The process as defined in claim 2, wherein said raw material in said digestion zone is heated with steam at a temperature between 160° and 190° C. for a time between 5 and 90 minutes, thereby to digest said raw material by means of the retained digestion liquor to form a pulp.

4. The process as defined in claim 3 wherein said quantity of digestion liquor carries effective alkali expressed as $Na_2O$ in an amount between 6 and 13 percent based on dry weight of said raw material.

5. The continuous process of producing pulp from cellulosic raw material, such as wood chips comprising: introducing a digestion liquor wherein the active digestion ingredient consists essentially of sodium sulphide into an impregnation zone, maintaining a body of said liquor at a temperature below digestion temperature under superatmospheric pressure in said impregnation zone, continuously moving said cellulosic raw material through said impregnation zone at a controlled rate thereby to cause said material to retain a quantity of digestion liquor carrying effective alkali expressed as $Na_2O$ in an amount between 6 and 13 percent based on dry weight of said raw material, continuously removing said raw material substantially free of excess liquor from said impregnation zone and into a digestion zone, subjecting said raw material in said digestion zone to a digestion temperature for a sufficient time to digest said material by means of the digestion liquor retained therein to form a pulp, separating the pulp from residual liquor, subjecting said residual liquor to noncombustive oxidation thereby to convert volatile sulphur compounds into nonvolatile sulphur compounds, concentrating said residual liquor, subjecting said concentrated residual liquor to a self-sustaining combustion in a recovery furnace thereby to recover heat and to form gaseous combustion products containing sulphur oxides and a smelt containing sodium sulphide and sodium carbonate, separating at least part of said sodium carbonate from said sodium sulphide, forming an aqueous solution of said sodium sulphide, and returning said formed aqueous solution of sodium sulphide as digestion liquor into the impregnation zone.

6. The process as defined in claim 5 wherein said sodium carbonate separated from said sodium sulphide is exposed to contact with said gaseous combustion products thereby to form products of absorption of said sulphur oxides in said carbonate, and said products of absorption are returned to the recovery furnace.

7. The continuous process of producing pulp from cellulosic raw material such as wood chips comprising: introducing a digestion liquor wherein the active digestion ingredient consists essentially of sodium sulphide into an impregnation zone, maintaining a body of said liquor at a temperature below digestion temperature under superatmospheric pressure in said impregnation zone, continuously moving said cellulosic raw material through said impregnation zone at a controlled rate thereby to cause said raw material to retain a quantity of digestion liquor carrying effective alkali expressed as $Na_2O$ in an amount between 6 and 13 percent based on dry weight of said raw material, continuously removing said raw material substantially free of excess liquor from said impregnation zone and into a digestion zone, maintaining in said digestion zone by means of steam a temperature between about 160° C. and about 190° C., continuously moving said raw material through said digestion zone at a controlled rate such that the material remains in the cooking zone for a period between 5 and 90 minutes, thereby to digest said raw material by means of the digestion liquor retained therein to form a pulp, separating the pulp from residual liquor, subjecting the residual liquor to noncombustive oxidation thereby to convert volatile sulphur compounds into nonvolatile sulphur compounds, concentrating said residual liquor, contacting said residual liquor with gaseous combustion products containing sulphur oxides from a recovery furnace thereby further to concentrate said residual liquor and simultaneously to cause absorption of said sulphur compounds, subjecting said further concentrated residual liquor to self-sustaining combustion in said recovery furnace thereby to recover heat and to form gaseous combustion products containing sulphur oxides and to form a smelt containing sodium sulphide and sodium carbonate, separating at least part of said sodium carbonate from said sodium sulphide to form re-cycle sodium carbonate, adding said re-cycle sodium carbonate into said concentrated residual liquor, forming an aqueous solution of said sodium sulphide, wherein said sodium sulphide constitutes at least 75 percent of the solute, and returning said formed aqueous solution of sodium sulphide as digestion liquor into the impregnation zone.

8. A process for continuously producing pulp from cellulosic raw material comprising: introducing a digestion liquor containing an alkali metal sulphide as substantially the only active digestion chemical into an impregnation zone, maintaining a body of said liquor at a temperature below digestion temperature and at superatmospheric pressure in said impregnation zone, introducing said cellulosic raw material into said impregnation zone and maintaining said material in said impregnation zone whereby said material retains a quantity of digestion liquor carrying sufficient chemical for subsequent digestion, conducting said cellulosic raw material substantially free of excess digestion liquor into a digestion zone, digesting said material in said digestion zone at a digestion temperature by means of the digestion liquor retained therein to form a pulp and thereby reducing the odor from said digestion.

9. A process as defined in claim 8 wherein said alkali metal sulphide is sodium sulphide.

10. A process as defined in claim 9 wherein said quantity of digestion liquor carries effective alkali expressed as $Na_2O$ in an amount between 6 and 13 percent based on dry weight of said material.

11. A process as defined in claim 9 wherein said material is digested in said digestion zone in a steam atmosphere at a temperature of between about 160° and 190° C. for a period of between about 5 and 90 minutes.

References Cited

UNITED STATES PATENTS

| | | | |
|---|---|---|---|
| 1,867,626 | 7/1932 | Kress | 162—82 |
| 1,902,106 | 3/1933 | Thomsen | 162—82 |
| 2,031,239 | 2/1936 | Thomsen | 162—82 |
| 2,582,054 | 1/1952 | Michon | 162—82 |
| 2,858,213 | 10/1958 | Durant et al. | 162—17 |

OTHER REFERENCES

Hanson, "The Theoretical Basis for the Action of Sulphide in the Kraft Pulping Process," Paper Trade Journal, Jan. 9, 1941, pages 32–38.

S. LEON BASHORE, *Primary Examiner.*

DONALL H. SYLVESTER, *Examiner.*